July 19, 1960 — E. M. ESTES — 2,945,723
WHEEL COVER
Filed Feb. 21, 1957
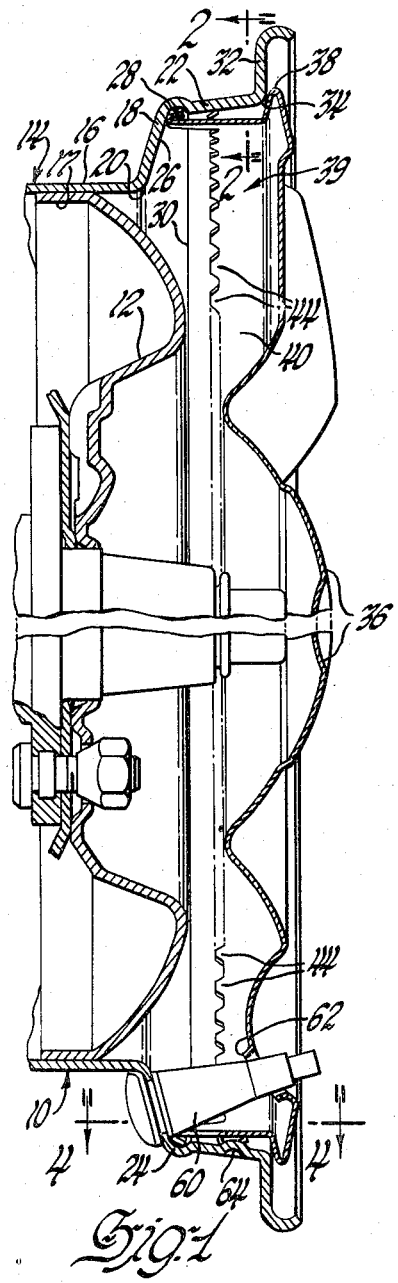
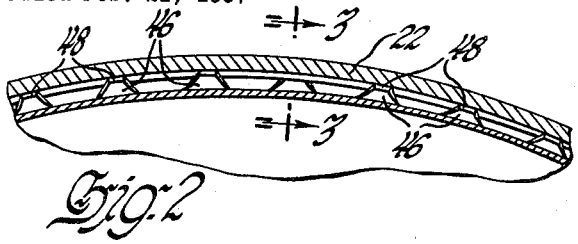
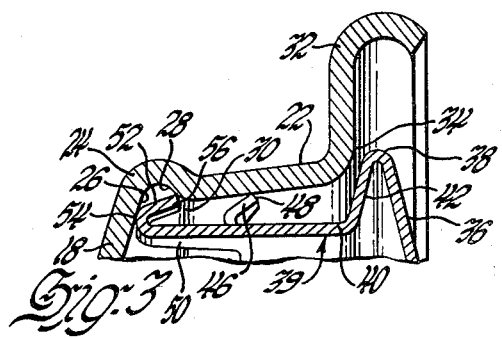
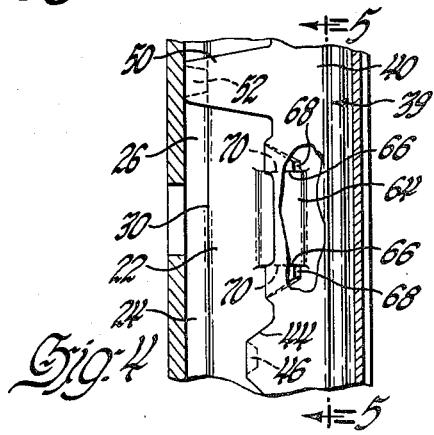
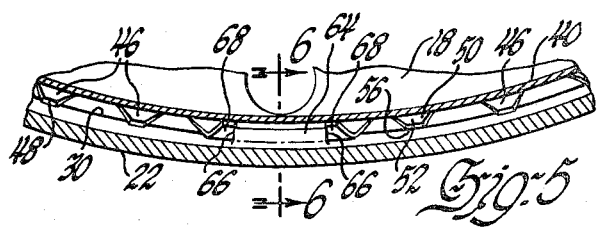
INVENTOR.
Elliott M. Estes
BY W. S. Pettigrew
ATTORNEY ÚUnited States Patent Office 2,945,723
Patented July 19, 1960

2,945,723

WHEEL COVER

Elliott M. Estes, Birmingham, Mich., assignor to General Motors Corporation, Detroit, Mich., a corporation of Delaware Filed Feb. 21, 1957, Ser. No. 641,684

2 Claims. (Cl. 301—37)

This invention relates to wheel covers and more particularly to a new and improved wheel cover for self-retaining engagement in predetermined spatial relationship with a vehicle wheel structure.

In the preferred embodiment of this invention, the vehicle wheel structure preferably includes a wheel rim of the type including an axially inner radially extending flange joined to an intermediate axially outwardly extending flange by a radially inwardly opening bead or groove. The wheel cover is of the full cover type and includes an axially extending annular marginal flange having axially spaced circumferential rows of gripping teeth. The teeth of the axially outwardly row are grippingly engageable with the intermediate flange of the wheel rim to provide the major retention means for the wheel cover. The teeth of the axially inwardly row have their proximal portions in engagement with the axially inner radial flange of the wheel rim and their distal portions in engagement with a wall of the radially inwardly opening groove or bead to provide the dual function of additionally retaining the wheel cover on the wheel rim and spacing the cover axially with respect to the wheel rim through engagement of the proximal portions of the teeth with the axially inner radially extending wheel rim flange. The circumferential axially spaced rows of teeth are discontinuous and each tooth in each row is spaced from an adjoining tooth.

In addition, the wheel cover also includes an anti-rotation means to prevent rotation of the cover relative to the vehicle wheel structure during movement of the vehicle. Since the valve stem of the usual pneumatic tire assembly extends outwardly through the wheel cover, the rotation of the wheel cover relative to the wheel structure is likely to distort or break this tire valve stem. By providing an anti-rotation means for the wheel cover, the cover may be accurately positioned on the wheel structure and remain in this position regardless of movement of the vehicle. The anti-rotation means includes a radially inwardly extending protuberance on the axially outwardly extending flange of the wheel rim having opposite flat sides. A number of teeth of the axially outwardly row are cut out and the tooth to either side of the cut out teeth is cut in half and bent against the axial flange of the cover to provide spaced opposing flat shoulders which are engageable with the opposing flat sides of the protuberance to prevent rotation of the cover on the wheel structure.

The primary object of this invention is to provide a new and improved wheel cover for self-retaining engagement with a vehicle wheel structure. Another object of this invention is to provide a new and improved wheel cover for self-retaining engagement in predetermined spatial relationship with a vehicle wheel structure. A further object of this invention is to provide a new and improved self-retaining wheel cover which includes axially spaced circumferential rows of cover retention teeth engageable with a cooperating vehicle wheel flange structure to retain the wheel cover on a wheel. Yet, another object of this invention is to provide a new and improved wheel cover having integral retaining means and spacing means mutually cooperable with a vehicle wheel flange structure to retain the cover on the wheel in predetermined spatial relationship thereto. Yet, a further object of this invention is to provide a new and improved anti-rotation means for wheel covers to prevent rotation of the cover relative to the wheel during movement of the vehicle.

These and other objects of this invention will be readily apparent from the following specification and drawings, in which:

Figure 1 is a fragmentary side elevational view in section of a vehicle wheel cover according to this invention in assembled relationship with a vehicle wheel;

Figure 2 is an enlarged partial sectional view taken on the plane indicated by line 2—2 of Figure 1;

Figure 3 is an enlarged sectional view taken on the plane indicated by line 3—3 of Figure 2;

Figure 4 is an enlarged sectional view taken on the plane indicated by line 4—4 of Figure 1 and showing the anti-rotation means;

Figure 5 is a sectional view taken on the plane indicated by line 5—5 of Figure 4; and Figure 6 is a sectional view taken on the plane indicated by line 6—6 of Figure 5.

Referring now particularly to Figures 1 and 3 of the drawings, a vehicle wheel 10 includes a load supporting wheel body 12 and a wheel rim 14 of drop center type. The wheel rim 14 includes an annular drop center flange 16 which may be secured in a suitable manner to an annular flange 17 of the wheel body in order to assemble the wheel. A radially and axially outwardly extending annular flange 18 is joined to flange 16 by an arcuate juncture portion or shoulder 20. Flange 18 is joined to an annular radially and axially outwardly extending intermediate flange 22 by a continuous annular radially inwardly opening groove 24. As may be seen particularly in Figure 3, the groove 24 includes a radially and axially inwardly extending inner wall 26 continuous with flange 18, and a radially and axially outwardly extending outer wall 28 which is joined to flange 22 by an arcuate juncture portion or shoulder 30. The terminal radially outwardly extending flange 32 of the wheel rim is joined to flange 22 by a curved juncture portion or shoulder 34.

As may be seen in Figure 1 of the drawings, a vehicle wheel cover 36 covers the opening of the wheel defined by the flange 22 of the wheel rim and includes an outer periphery or margin 38 of larger diameter than the greatest diameter defined by flange 22. The cover retaining flange structure 39 includes an axially inwardly extending continuous annular flange 40 to the rear of the cover which is joined to the margin 38 thereof by an intermediate radially outwardly extending annular flange 42. Since the cover retaining flange structure 39 is formed integral with cover 36 of resilient material, such as stainless steel, the flange structure 39 is resiliently and bodily deflectable toward and away from the rear side of the cover about the margin 38 of the cover, as will be explained.

As may be seen particularly in Figure 1 of the drawings, a circumferential row of individual spaced fingers 44 project axially inwardly from flange 40 and are provided with radially and axially outwardly extending teeth 46. The distal portions of the teeth are provided with sharp edges 48 which grippingly engage the flange 22 of the wheel rim to provide the major retention of the cover on the wheel structure.

At spaced intervals about the annular flange 40 a number of individual spaced fingers 50 project axially inwardly from flange 40 beyond the fingers 44. The fingers 50 extend from the flange 40 intermediate successive fingers 44 and are preferably spaced about the periphery of the flange at intervals of 90 degrees. The fingers 50 are provided with radially and axially outwardly extending teeth 52 which are joined on arcuate junctures 54 at their proximal portions to the fingers 50 and include a sharp edge 56 at their distal portions.

When the cover is in assembled relationship with the wheel structure as shown particularly in Figure 3, the juncture portions 54 of the teeth 52 engage the radially and axially outwardly extending inner wall 26 of the groove 24 to provide a positive limit stop limiting inward movement of the cover relative to the wheel rim to determine the spacing between flange 42 of the cover and shoulder 38 of the wheel rim. In addition, the sharp edges 56 at the distal portions of the teeth 52 are engageable with the radially and axially outwardly extending outer wall 28 of the groove 24 immediately adjacent the arcuate juncture 30 of the groove and flange 22 to provide an additional retention means for the cover which is cooperable with the major retention means provided by the teeth 46 to hold the cover on the wheel rim.

As previously set forth, the cover retaining flange structure 39 is bodily and resiliently deflectable toward and away from the rear of the cover about the margin 38 thereof. When the cover is disassembled from the wheel, the distal portions of teeth 46 and of teeth 52 define circles of substantially equal diameter but of greater diameter than the largest diameter of flange 22. Thus, when the cover is mounted on the wheel, the sharp edges 48 of teeth 46 and 56 of teeth 52 move inwardly along the surface of flange 22 to bodily deflect the flange structure 39 toward the rear of the cover bodily so that the resiliency of the flange structure 39 provides a radially outward force when the cover is mounted on the body. This force causes the sharp edges 48 of teeth 46 to grip flange 22 to provide the major retention means for the cover. Since the teeth 52 extend radially and axially inwardly as does the inner wall 26 of groove 24 while the outer wall 28 of the groove extends in an opposite direction, the resiliency of flange structure 39 tends to wedge teeth 52 between the walls 26 and 28 to hold the sharp edges 56 of the teeth in gripping engagement with the wall 28 of the groove. The arcuate shoulder 30 serves to guide the teeth 52 in place between walls 26 and 28 so that the cover may be easily applied in a continuous axially inward direction of movement as the sharp edges 56 of the teeth follow the contour of the shoulder during the final stages of the axial inward movement of the cover.

Although the radially and axially inwardly extending flange 42 is shown in spaced engagement with the shoulder 34 to provide an air gap therebetween, it will be noted that the air gap may either be made smaller or larger or may be dispensed with entirely by varying the effective length of the fingers 50 from their connection with the flange 40 to their juncture portions 54 with teeth 52.

Referring now particularly to Figures 1 and 4 through 6 of the drawings, the anti-rotation means will be described.

As can be seen in Figure 1 of the drawings, a tire valve stem 60 secured in a suitable manner to the flange 18 of the wheel rim extends outwardly therefrom through an opening 62 in the cover 36 when the cover is assembled on the wheel structure. In the arrangement shown, the tire valve stem is intended for use with a tubeless pneumatic tire. In the event that a pneumatic tire and tube assembly is employed, the tire valve stem 60 would then be secured to the tube and project outwardly through a suitable opening in the flange 18 and the opening 62 in cover 36.

During movement of the vehicle, the cover 36 often tends to rotate relative to the wheel structure. This rotation can cause serious damage to the tire valve stem 60 since the stem may be distorted or may be broken.

In order to prevent any rotation of the cover relative to the wheel structure during movement of the vehicle, an anti-rotation means is provided and will now be described with particular reference to Figures 4 through 6.

A protuberance 64 which is formed integral with the flange 22 of the wheel rim and extends radially inwardly therefrom is provided with opposite flat sides or shoulders 66, as may be seen in Figures 4 and 5. The protuberance is semi-circular in cross section, as shown in Figure 6, although its cross sectional configuration may be otherwise, if so desired. As may be seen in Figure 4, certain of the fingers 44 are cut away from the flange 40 and the finger to either side of the cut away fingers is cut in half after removing the teeth 46 therefrom so that the half fingers 68 define opposed circumferentially facing edges 70 which are spaced apart a distance substantially equal to or slightly smaller than the distance between the shoulders 66 of protuberance 64. The half fingers 68 are then bent back against the radially outer surface of the flange 40 as shown in Figure 6 to define spaced closed beads. The normal outer diameter of the beads is greater than the diameter of the flange 22 through the center line of the protuberance 64 so that the resilience of the flange structure 39 causes each of the half fingers 68 to engage the flange 22 to either side of the protuberance when the wheel cover is assembled on the wheel structure. In addition, the opposite edges 70 of the fingers 68 engage the opposite side edges 66 of the protuberance to provide an interlock preventing rotation of the wheel cover relative to the wheel in assembled relationship.

As previously mentioned, the fingers 50 are spaced about the periphery of the flange 40 preferably at 90 degree intervals. As may be seen particularly in Figure 4, one of these fingers is positioned immediately adjacent the anti-rotation means between the wheel cover and the wheel rim. Although the fingers 50 are preferably located at 90 degree intervals, they may be located otherwise if so desired.

When it is desired to assemble the wheel cover on the wheel rim, the opening 62 in the cover is centered with the valve stem 60 so that the fingers 68 will be centered with respect to the protuberance 64. Thereafter, the cover 36 is moved axially inwardly of the wheel structure to cause the teeth 46 and 52 to grippingly engage the wheel rim as previously described and to move the fingers 68 into engagement with opposite sides of the protuberance 64. Since the outer surface of the fingers 68 lies in a circle of larger diameter than the diameter of flange 22 through the center line of the protuberances 64, the resiliency of the cover retaining flange structure 39 holds the fingers in engagement with the flange 22 to either side of the protuberance to insure that the opposite edges 70 of the fingers will be in a position to engage the opposite edges 66 of the protuberances.

When it is desired to disassemble the wheel cover from the wheel, a suitable pry off tool, such as a screwdriver, is inserted into the opening between flange 42 and the shoulder 34 of the tire rim. Thereafter, by suitable manipulation of the tool, the cover retaining flange structure may be bodily deflected towards the rear of the cover to release the teeth 46 and 52 and allow the wheel cover to be disassembled from the wheel.

By providing a wheel cover of the preferred structure as described, the cover is adequately retained on the wheel rim against accidental dislodgment during service and is also spaced a predetermined distance from the wheel rim so that an air gap of the desired size may be provided or that no air gap may be provided. If no air gap is provided and the flange 42 is in engagement with the shoulder 34 of the wheel rim, the fingers 50 and the teeth 52 then solve another common problem in wheel covers. This is the problem of squeaking whereby the flange structure 39 of the cover moves axially inwardly and outwardly with respect to the wheel rim during service to distort flange 42 and cause portions thereof to rub against shoulder 34 and flange 32. Since the teeth 52 engage a fixed wall 28, the teeth will prevent this squeaking by preventing the flange structure 39 of the cover from moving axially inwardly and outwardly with respect to the wheel rim. Even though the teeth 46 grippingly engage the wheel rim, this axial inward and outward movement is possible since they engage an axial surface which tends to allow this movement rather than a radial surface as do the teeth 52. Thus, it can be seen that the wheel cover of this invention has many varied and possible uses and solves many of the problems attendant with the use of self-retaining wheel covers.

I claim:

1. In a wheel structure including a wheel body and a wheel rim having a generally axially inwardly extending flange joined at its axial inner portion to a generally radially extending flange, a cover for said wheel including a cover body and cover retaining flange structure extending axially inwardly therefrom in radially spaced relationship to said axially inwardly extending flange of said wheel rim, and cover retention means on said flange structure for retaining said cover on said wheel and spacing said cover with respect to said radially extending wheel rim flange, said cover retention means including a plurality of axially spaced circumferential rows of spaced teeth lying in spaced generally parallel radial planes, one of said rows of teeth having their distal portions in gripping biting engagement with said axially extending flange to thereby retain said cover on said wheel against axially outward movement therefrom, and the other of said rows having their proximal portions in engagement with said radially extending flange and their distal portions in gripping biting engagement with said axially extending flange in wedging engagement therebetween to additionally retain said cover on said wheel against axially outward movement therefrom and space said cover with respect to said radially extending wheel rim flange, said one row of teeth being divided into a plurality of spaced quadrants of teeth around the periphery of said cover, said quadrants being spaced apart by intervening flange structure merging into the teeth of said other of said rows to stagger said rows of teeth circumferentially with respect to each other.

2. In a wheel structure including a wheel body and a wheel rim having a generally axially inwardly extending flange joined at its axial inner portion to a generally radially extending flange by a radially inwardly opening groove, a cover for said wheel including a cover body and cover retaining flange structure extending axially inwardly therefrom in radially spaced relationship to said axially inwardly extending flange of said wheel rim, and cover retention means on said flange structure for retaining said cover on said wheel and spacing said cover with respect to said radially extending wheel rim flange, said cover retention means including a plurality of axially spaced circumferential rows of spaced teeth lying in spaced generally radial planes, one of said rows of teeth having their distal portions in gripping biting engagement with said axially extending flange to thereby retain said cover on said wheel against axially outward movement therefrom, and the other of said rows having their proximal portions in engagement with one of the walls of said groove and their distal portions in gripping biting engagement with the other of the walls of said groove in wedging engagement therebetween to additionally retain said cover on said wheel against axially outward movement therefrom and space said cover with respect to said radially extending wheel rim flange, said one row of teeth being divided into a plurality of spaced quadrants of teeth around the periphery of said cover, said quadrants being spaced apart by intervening flange structure merging into the teeth of said other of said rows to stagger said rows of teeth circumferentially with respect to each other.

References Cited in the file of this patent

UNITED STATES PATENTS

| 2,660,480 | Lyon | Nov. 24, 1953 |
| 2,804,346 | Landell | Aug. 27, 1957 |
| 2,804,348 | Lyon | Aug. 27, 1957 |

FOREIGN PATENTS

| 491,457 | Canada | Mar. 24, 1953 |
| 1,041,268 | France | May 27, 1953 |
| 744,837 | Great Britain | Feb. 15, 1956 |
| 529,973 | Canada | Sept. 4, 1956 |